US 9,026,801 B2

(12) United States Patent
Balinsky et al.

(10) Patent No.: US 9,026,801 B2
(45) Date of Patent: May 5, 2015

(54) SYSTEM CALL INTERCEPTION

(75) Inventors: Helen Balinsky, Wales (GB); Neil Moore, Glasgow (GB); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 366 days.

(21) Appl. No.: 13/457,309

(22) Filed: Apr. 26, 2012

(65) Prior Publication Data

US 2013/0291051 A1 Oct. 31, 2013

(51) Int. Cl.
*G06F 11/00* (2006.01)
*G06F 21/00* (2013.01)
*G06F 21/55* (2013.01)

(52) U.S. Cl.
CPC ............. *G06F 21/00* (2013.01); *G06F 21/552* (2013.01)

(58) Field of Classification Search
CPC .................................. H04L 29/06884
USPC ............................. 713/187; 726/22
See application file for complete search history.

(56) References Cited

U.S. PATENT DOCUMENTS

| 7,496,348 | B2 * | 2/2009 | Srey et al. ..................... 455/410 |
| 7,676,760 | B1 * | 3/2010 | Rosenquist et al. .......... 715/789 |
| 8,078,886 | B2 | 12/2011 | Dotan |
| 8,544,060 | B1 * | 9/2013 | Khetawat ......................... 726/1 |
| 2008/0040800 | A1 | 2/2008 | Park |
| 2008/0177994 | A1 * | 7/2008 | Mayer ............................. 713/2 |
| 2010/0011444 | A1 * | 1/2010 | Yodaiken ........................ 726/26 |
| 2011/0083190 | A1 | 4/2011 | Brown et al. |

OTHER PUBLICATIONS

Zhaohui Liang, "Against Code Injection with System Call Randomization", 2009 Int'l Conf. on Networks Security, Wireless Communications and Trusted Computing, IEEE, 584-587.
Steven J. Simske, et al., "APEX: Automated Policy Enforcement eXchange",DocEng '10, Sep. 21-24, 2010, Manchester, UK. Copyright 2010 ACM 978-1-60558-575-8/09/09.
Danny Lieberman, "Preventing intellectual property abuse", 2009, available at http://www.software.co.il/downloads/preventing-intellectual-property-abuse.pdf.
H. Balinsky, et al., "System Call Interception Framework for Data Leak Prevention",EDOC 2011:Aug. 29-Sep. 2, 2011, Helsinki, Finland, pp. 139-148. DOI: 10.1109/EDOC.2011.19.

* cited by examiner

*Primary Examiner* — Christopher Brown
(74) *Attorney, Agent, or Firm* — Douglas Weller

(57) ABSTRACT

System call interception is activated for an application process. It is recorded that system call interception is active for the application process. Ongoing checking is performed to determine whether system call interception remains active.

15 Claims, 3 Drawing Sheets

SYSTEM CALL INTERCEPTION

BACKGROUND

The unintentional release or disclosure of sensitive information to an untrusted environment is a serious problem for any organization. Sensitive information at risk can include, for example, financial information, personal identity information, health information, intellectual property and so on. Unintentional release of information, also called data leaks, can occur in a wide variety of scenarios such as, for example, through the sending of a sensitive e-mail to the wrong address, uploading a confidential document instead of a conference submission, saving an unprotected document backup on an 'easy-to-lose' USB drive, printing and then leaving a sensitive document on a widely accessible printer and so on.

DETAILED DESCRIPTION

In order to prevent data leaks, an organization can develop a series of policies that determine, for example, which action of various users should be prevented or at least cautioned against.

For example, the policies may require prevention, or caution against, the exposure of sensitive data by such actions as transmission by e-mail, storage on portable drives, and printing on unsecure printers. The policies may depend, for example, on the sensitivity of data being accessed as well as the identity of the user accessing the data.

Figure 1:
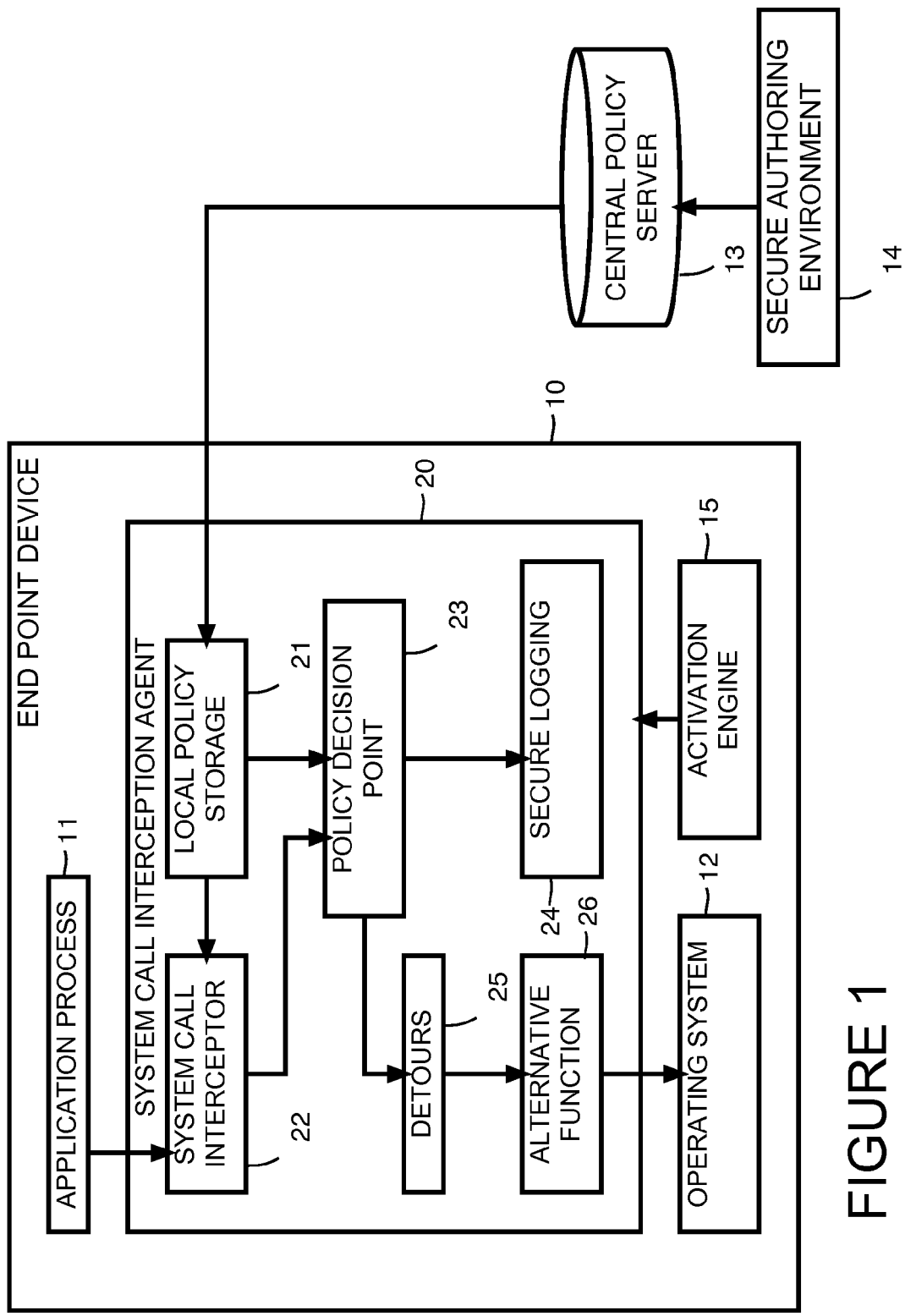
FIG. 1 is a simplified block diagram showing a system call interception agent inserted between an application process and an operating system to prevent data leaks, in accordance with an implementation.

As shown in FIG. 1, a secure authoring environment 14 can be used to develop and safeguard the policies. The policies can then be stored in a secure central policy server 13. Central policy server 13 can be, for example, an organization-wide service implemented on a single server or a cluster of synchronized servers.

The policies stored within central policy servers are implemented within end point devices, for example, by a system call intercept (SCI) agent that intercepts system calls made from an application process to the operating system for the end point device. For example, an end point device is any device with processing capability, such as a server, a desktop computer, a laptop computer, computer tablet, a smart phone, a personal digital assistant and so on.

An application process is an instance of an application program that is being executed. An application process for which system call interception is activated may be, for example, a process for any application that performs actions that may result in a data leak. Examples of actions whose performance may result in a data leak are saving a file, copying a file, moving a file, uploading a file, sending e-mail, printing and so on.

A system call is any invocation of an operating system function by an application process. A system call intercept is any interception, for example by a SCI agent or another process, of a system call from an application process to an operating system.

FIG. 1 shows a SCI agent 20 inserted so as to capture system calls from an application process 11 to an operating system 12 within an end point device 10. Operating system 12 can be any type of operating system that manages hardware resources of end point device 10 and provides common services for application processes. Application process 11 can be any computer process that performs operations in response to user interactions. SCI agent 20 includes local policy storage 21. Local policy storage 21 stores at least a subset of the policies, stored in central policy server 13, that apply to end point device 10. For example, policies stored in local policy storage 21 are automatically synchronized with policies stored in central policy 13. An alternative arrangement without local policy storage 21 may include a local policy enforcement mechanism where the policies are not stored within end point device 10. In this case, for example, data could be uploaded to central policy sever 13 and evaluated for any potential breach of policies stored within central policy storage 13. Then, for example, central policy server 13 instructs end point device 10 on how to handle any violation of a policy stored in central policy storage 13.

When application process 11 makes a system call, a system call interceptor 22 intercepts the system call. A policy decision point 23 utilizes policies in local policy storage to determine how the system call should be handled. Some or all of the system calls and decisions made are stored within secure logging 24.

When policies within local policy storage 21 indicate a system call should be intercepted, detour logic 25 and alternative function logic 26 take action before making system calls into operating system 12. For example, if the user is identified as a trusted user, detour logic 25 may merely give a warning to the user that an operation is about to be performed that may compromise information. The trusted user will be given the chance to confirm if this is an action that is really to be taken. Upon confirmation from the trusted user, the system call requested by application process 11 is allowed to proceed.

In more secured environments, or with a less trusted user, detour logic 25 may issue a warning to the user that the action desired to be taken is not allowed. Function logic 26 may then prevent the system call from being executed and may even disable further user actions on end point device 10. For example, function 26 may offer the user an alternative or modified action and then may assist the user in accomplishing the action. For example, function 26 may assist the user in encrypting data before the data is sent or stored.

For example, there is a secure communication channel between end point device 10 and central policy server 13. Running of SCI agent 20 is mandatory. Policies from central policy server 13 must be updated within end point device 10 within a policy define interval time or default restrictive policies are applied. When end point device 10 appears on-line from an off-line mode, end point device 10 immediately communicates with central policy server 13 to receive the latest policies.

An activation engine 15, shown in FIG. 1, includes logic used to start and monitor operation of a system call intercept agent such as system call intercept agent 20.

Figure 2:
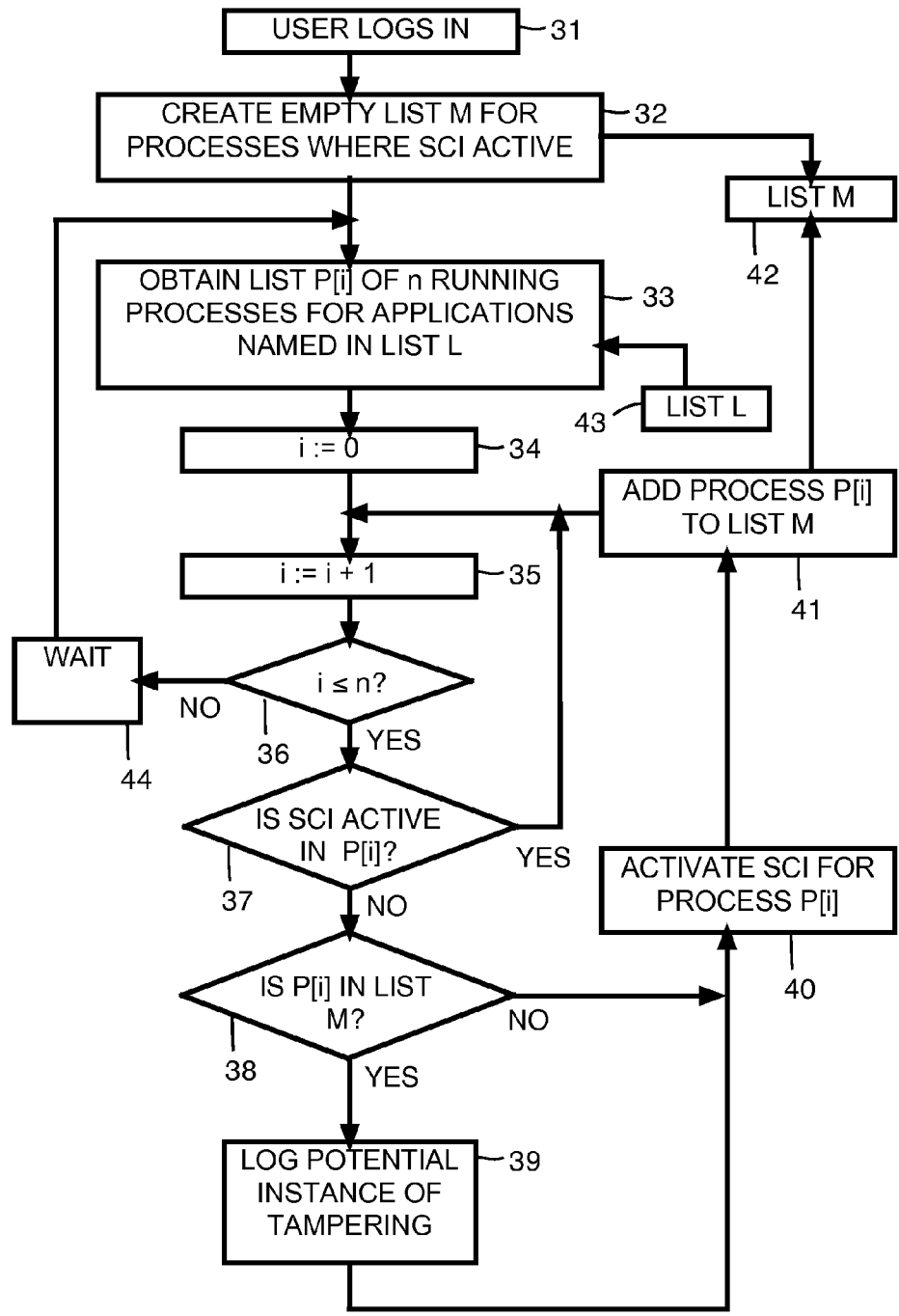
FIG. 2 is a simplified block diagram flow chart illustrating logic used to start and monitor operation of system call intercept agent, in accordance with an implementation.

FIG. 2 is a simplified block diagram flow chart illustrating operation of activation engine 15 upon a user logging in. In a block 31, a user logs in. In a block 32, a list M is created. In another situation, a user might be logged in for a while, when due to change in monitoring level a system call intercept agent is activated and in block 32, list M is created. In FIG. 2, list M is identified by a reference number 42. List M is initially empty when created, but will eventually identify all application processes operating in the user session for which a SCI agent will intercept system calls.

A list L, identified in FIG. 2 by a reference number 43, contains a list of applications for which, according to policies stored within central policy server 13, an SCI agent is to intercept system calls in order to guard against potential data leaks. In a block 33, list L is referenced to determine processes corresponding to applications listed in list L, that are currently running in the user session. Into these processes a SCI agent will be injected for the purpose of intercepting system calls. What is meant by injecting of a SCI agent is to inject programming code—for example, in the form of a dynamic linked library—into an application process that implements a SCI agent that captures system calls sent from the process to the operating system. When the process makes a system call, the SCI agent intercepts the system call before the system call reaches the operating system. For example, if there are n processes running for applications named in list L, the n processes can be referred to as processes P[i], where i is an integer variable numbered from 1 to n.

While, depending on implementation, list L can be reasonably static, it is also possible that list L can be updated dynamically, for example, by central policy server 13. For example, certain scenarios trigger central policy server to add or subtract applications from list L. For example, if it is suspected that an attack is underway against end point device 10, or if a software virus is detected within end point device 10, central policy server 13 may enter a heighted monitoring state and increase the number of applications in list L and/or may change policies to more restrictively and thoroughly guard against data leaks.

Also, for example, an audit of end user device 10 can be performed by activating system call interception for a larger number of processes and/or more thoroughly logging information about intercepted system calls. During the audit, the number of applications in list L may be increased, the policies for handling intercepted system calls can be changed and the amount of logging, etc, may be increased. After completion of the audit, the number of applications in list L and the information logged can be restored, for example, to pre-audit levels.

When the number of applications in list L is decreased and/or the implemented policies for processes may be changed to be less restrictive, system call interception may be ending or changing for certain processes. In this case care is exercised when, for example, removing an SCI agent from between the process and the operating system so that operation of the process is not adversely affected resulting in, for example, a crash of the process or some other deleterious result. This exercise of care may be achieved by leaving system call interception active for a time for a process until an opportune time occurs in which the system call interception can be inactivated for the process without any deleterious effects.

In a block 34, the variable i is set equal to 0. In a block 35, the variable i is incremented. In a block 36, a check is made to see whether i is less than or equal to n. If so, this means traversing through all the n processes is not complete. In a block 37, a check is made to determine if system call interception (SCI) is active for process P[i]. The check also, for example, confirms that the programming code implementing system call interception has not been tampered with. The confirmation that there has been no tampering can be performed, for example, on the basis of checking the authenticity of the programming code implementing system call interception, for example by checking the signature of the programming code implementing system call interception. For example if the programming code implementing system call interception is a dynamic linked library injected into process P[i], the signature of the dynamically linked library as it currently is in the file is compared with the signature of the dynamically linked library as it was when it was originally injected in process P[i]. If the signatures match, then the conclusion in the check in block 37 would be that system call interception (SCI) is active for process P[i]. If the signatures do not match, then the conclusion in the check in block 37 would be that system call interception (SCI) is not active for process P[i].

If in block 37 it is determined that system call interception (SCI) is active for process P[i], then in block 35, the variable i is incremented and the next process is checked. If in block 37 it is determined that system call interception is not active for process P[i], in a block 38 a check is made to see if P[i] is in list M. If not, in a block 40 system call interception is activated for process P[i]. This means a SCI agent will intercept system calls from process P[i] and handle the system call in accordance with policies stored in central policy server 13. In a block 41, process P[i] is added to list M. Then, in block 35, the variable i is incremented and the next process is checked.

If in block 38, process P[i] is in list M, this indicates a potential incidence of tampering. That is, process P[i] was formerly put in list M indicating system call interception was activated for process P[i]. But the check in block 37 indicated system call interception is not currently active. This suggests system call interception has been turned off for process P[i], possibly as a result of tampering, for example, by a user of the end point device trying to circumvent policies stored in central policy server 13. Also, if in block 37 signatures were checked and did not match, this would also indicate the possibility of tampering.

In a block 39, any potential instance of tampering is logged. Depending on implementation additional or alternative actions can be taken in block 39. For example, the system administrator can be alerted, for example by being sent an e-mail or by some other means. The user can be alerted, for example, by a pop-up window. In a very secure environment, a potential instance of tampering can be handled by deactivating end point device 10, immediately increasing a monitoring level, and/or increasing restrictive policies, for example, including preventing any further traffic out of end point device 10. And so on. Additionally, in block 40, system call interception is again activated for process P[i].

If the process illustrated by blocks 31 through 41 in FIG. 2 is performed only when a user logs in and new processes start, it may be possible for a user to disable system call interception, perform actions not permitted by policies within central policy sever 13, and then re-enable system call interception, thereby circumventing policies within central policy sever 13 possibly without detection.

In order to avoid such circumvention, the process illustrated by blocks 31 through 41 is performed periodically when the user remains logged in. Specifically, in block 36, when i is greater than n, this means all the currently processes have been checked. Then, in a wait block 44, a period of time is allowed to elapse. Then, beginning in block 33 the process is restarted by again obtaining a list of the n currently running processes P[i] for applications in list L. Because during the elapsed wait times, different processes may have started or stopped, n may be a different value than before.

The amount of elapsed time in wait block 44 is selected based on level of security and system performance. If the elapsed time in wait block 44 is too short, it may impact performance of some systems. If the elapsed time in wait block 44 is too long, it may allow tampering to occur in the interval without detection. One way to balance system performance with security is to vary the duration of the elapsed time in wait block 44 according to a predetermined pattern or according to some random or pseudo random pattern. In this way a user will not be able to predict whether tampering will be detected. This can discourage tampering and increase the likelihood of detecting tampering while minimizing the impact on system performance. For example, a maximum amount of elapsed time in wait block 44 may be chosen that is short enough to assure a malicious attacker does not have time, within the elapsed time in wait block 44, to export undetected even the smallest sized sensitive document out of end point device 10.

For example, the elapsed time in wait block 44 can be cut short whenever a new process is started that is for one of the applications listed in list L. Alternatively, in a separate process, activity on end point device 10 can be modified so that whenever a new process is started, a check can be made if it is for one of the applications listed in List L, and if so, system call interception can be activated for the process and the process added to list M.

Figure 3:
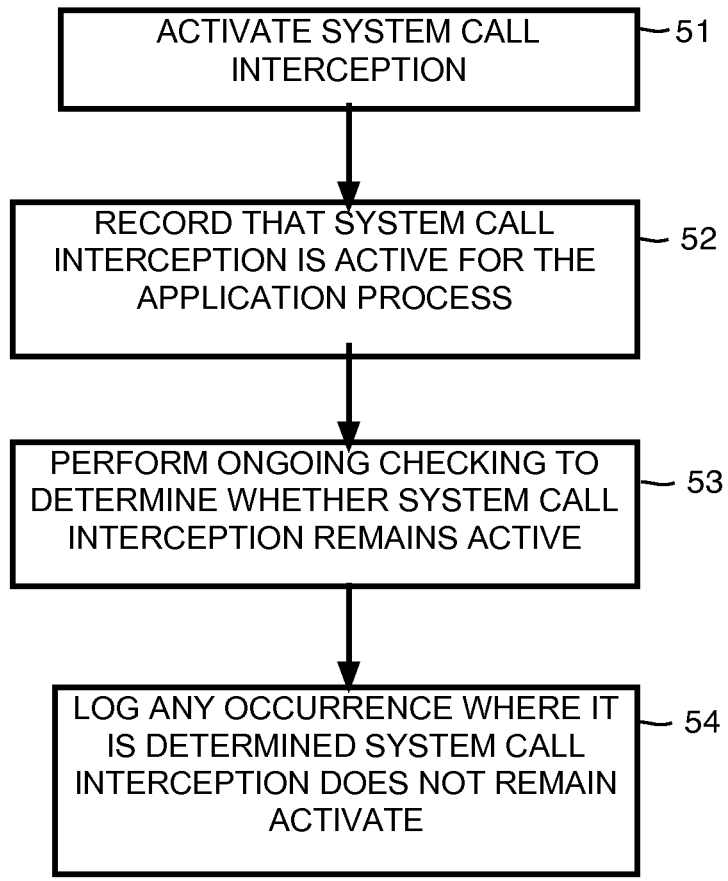
FIG. 3 is a simplified block diagram flow chart illustrating logic used to start and monitor system call interception, in accordance with an implementation.

FIG. 3 is a simplified block diagram flow chart illustrating logic used to start and monitor system call interception regardless of how system call interception is implemented. For example, the logic can be implemented using instructions within computer readable code stored on non-transitory computer readable medium.

In a block 51, system call interception is activated for an application process running under a user session or under user sessions in a multi-user device. For example, if multiple users of a device are sharing use of an application, system call interception for the processes of the application may be used to prevent data leak from all the user sessions utilizing the application. In a block 52, it is recorded that system call interception is active for the application process.

In a block 53, ongoing checking is performed to determine whether system call interception remains active for the application process. The amount of elapsed time between each check may be constant or varied in accordance, for example, with a predetermined pattern or in accordance with some random or pseudo random pattern.

In a block 54, any occurrence where an ongoing check discovers system call interception does not remain activated is logged. In addition to, or instead of, logging, other action may be executed. For example, an administrator may be informed of a potential breach of policy, a user may be alerted, a user's account may be deactivated, the device may be deactivated, a login session may be suspended, more restrictive policies implemented or another action or combination of actions taken to log, detect and/or protect against data leaks.

The disclosed subject matter may be implemented in other specific forms without departing from the spirit or characteristics thereof. Accordingly, the present disclosure is intended to be illustrative, but not limiting, of the scope of the following claims.

We claim:

1. A non-transitory computer readable medium storing computer readable code, the computer readable code comprising instructions for:

activating system call interception for an application process running under a user session on a device in order to prevent data leaks of sensitive documents having at least a smallest size;

recording that system call interception is active for the application process;

performing ongoing random or pseudo-random checking by varying an amount of elapsed time between checking to determine whether system call interception remains active for the application process to increase the likelihood of detecting tampering of the system call interception; and, reactivating system call interception for any application process where it is determined system call interception did not remain active and wherein the maximum amount of elapsed time is short enough to ensure sensitive documents having at least the smallest size are not leaked from the device.

2. Non-transitory computer readable medium as in claim 1 wherein the instructions are additionally for:

maintaining a first list of application processes;

receiving a dynamic second list of applications for which the system call interception is to be activated; and identifying application processes in the first list based on the second list and creating a third list that identifies all application processes operating on the device for which a system call interception has been activated.

3. Non-transitory computer readable medium as in claim 2 wherein the instructions are additionally for:

activating system call interception for a larger number of processes for an audit by increasing the number of applications on the dynamic second list; and after completion of the audit, restoring the dynamic second list to pre-audit levels.

4. Non-transitory computer readable medium as in claim 1 wherein activating system call interception for application process running under a user session includes injecting a system call interception agent to intercept system calls.

5. Non-transitory computer readable medium as in claim 1 wherein activating system call interception for application process running under a user session includes using policies stored locally and automatically synchronized with policies stored in a central policy server to identify the application process for which to activate system call interception.

6. Non-transitory computer readable medium as in claim 1 wherein the instructions are additionally for:

handling intercepted system calls in accordance with policies stored in a central policy server.

7. Non-transitory computer readable medium as in claim 1 wherein performing ongoing checking to determine whether system call interception remains active for the application process includes checking authenticity of programming code used to perform system call interception.

8. Non-transitory computer readable medium as in claim 1 wherein the instructions are additionally for:

deactivating system call interception for the application process in response to a change in policy stroked in a central policy server.

9. A device comprising:

hardware resources;

an operating system to manage hardware resources and that provides service for an application process;

a system call interception agent to intercept system calls from the application process to the operating system to prevent data leaks of sensitive documents of at least a smallest size in the device, so that each intercepted system call is handled by the system call interception agent in accordance with a predetermined policy; and, an activation engine to activate the system call interception agent to intercept system calls from the application process to the operating system and to perform ongoing random or pseudo-random checking to vary an amount of elapsed time between checking that the system call interception agent remains active to intercept system calls from the application process to the operating system to increase the likelihood of detecting tampering of the system call interception agent, the activation engine to further reactivate system call interception for any application process where it is determined system call interception did not remain active and wherein the maximum amount of elapsed time is short enough to ensure sensitive documents having at least the smallest size are not leaked from the device.

10. A device as in claim 9 the activation engine further to:
maintain a first list of application processes;
receive a dynamic second list of applications for which the system call interception is to be activated; and
identify application processes in the first list based on the second list and creating a third list that identifies all application processes operating on the device for which a system call interception has been activated.

11. A device as in claim 10 the activation engine further to:
activate system call interception for a larger number of processes for an audit by increasing the number of applications on the dynamic second list; and
after completion of the audit, restore the dynamic second list to pre-audit levels.

12. A device as in claim 9 wherein the activation engine increases a number of applications for which system call interception is activated in response to a heightened monitoring state.

13. A device as in claim 12 wherein the heighted monitor state occurs during at least one of the following:
a perceived attack is underway against the device;
a software virus has been detected within the device;
an audit is being performed.

14. A computer implemented method comprising:
injecting a system call interception agent between a process and an operating system that manages hardware resources of a device to prevent data leaks of sensitive documents of at least a smallest size in the device, the system call intercept agent intercepting calls from the process to the operating system and the call intercept agent taking actions in accordance with policies stored in a central policy server;
performing ongoing random or pseudo-random checking by varying an amount of elapsed time between checking to determine whether the system call interception agent remains active between the process and the operating system to increase the likelihood of detecting tampering of the system call interception agent; and,
reactivating the system call interception agent between the process and the operating system when it is determined that the system call interception agent has not remained active between the process and the operating system and wherein the maximum amount of elapsed time is short enough to ensure sensitive documents having at least the smallest size are not leaked from the device.

15. A computer implemented method as in claim 14 additionally comprising:
performing at least one of the following actions when it is determined that the system call interception agent does not remain active between the process and the operating system:
alerting an administrator,
alerting a user,
increasing a monitoring level,
deactivating a login session,
activating a more restrictive policy.

* * * * *